(12) United States Patent
Sexton (10) Patent No.: US 10,628,852 B2
(45) Date of Patent: *Apr. 21, 2020

(54) AUGMENTED REALITY SERVER

(71) Applicant: Hewlett-Packard Development Company, L.P., Houston, TX (US)

(72) Inventor: Douglas A. Sexton, La Jolla, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 496 days.

This patent is subject to a terminal disclaimer.

(21) Appl. No.: 15/476,081

(22) Filed: Mar. 31, 2017

(65) Prior Publication Data

US 2017/0206555 A1    Jul. 20, 2017

Related U.S. Application Data

(63) Continuation of application No. 13/562,479, filed on Jul. 31, 2012, now Pat. No. 9,674,419.

(51) Int. Cl.
*G06Q 30/02* (2012.01)
*G06K 9/00* (2006.01)
*H04N 5/232* (2006.01)
*G06T 11/60* (2006.01)

(52) U.S. Cl.
CPC ..... *G06Q 30/0255* (2013.01); *G06K 9/00671* (2013.01); *G06T 11/60* (2013.01); *H04N 5/23206* (2013.01); *H04N 5/23222* (2013.01); *H04N 5/23293* (2013.01); *G06Q 30/0277* (2013.01)

(58) Field of Classification Search
CPC .... G06Q 30/06; G06Q 30/02; G06Q 30/0267; G06Q 30/0641; G06Q 30/0643; G06Q 30/0224; G06Q 30/0238; G06Q 30/0269; G06Q 30/0271; G06Q 30/0281
See application file for complete search history.

(56) References Cited

U.S. PATENT DOCUMENTS 9,064,326 B1 *   6/2015   Loxam ............... G06K 9/00671
2005/0097204 A1 * 5/2005   Horowitz ............... G06Q 30/02
                                                                 705/14.69

(Continued)

FOREIGN PATENT DOCUMENTS

WO    WO-2007065750 A1    6/2007

OTHER PUBLICATIONS

Reynolds et al, Exploiting Linked Open Data for Mobile Augmented Reality, May 29, 2010, Digital Enterprise Research Institute, National University of Ireland—6 pages.

(Continued)

*Primary Examiner* — Sun M Li
*Assistant Examiner* — Thuy N Nguyen
(74) *Attorney, Agent, or Firm* — Robert Sismilich (57) ABSTRACT

In one example, an augmented reality (AR) server. The server has an AR server program executable to transmit a first aura having a selectable weblink to a web-linked camera device (WLCD); receive from a website an identity that uniquely associates the WLCD with a user and aura data indicative of a second aura targeted to the user based on a user-selected weblink; and transmit the second aura to the WLCD corresponding to the identity.

15 Claims, 7 Drawing Sheets

(56) References Cited

U.S. PATENT DOCUMENTS

| | | | |
|---|---|---|---|
| 2010/0008265 A1* | 1/2010 | Freer | H04N 1/00307 |
| | | | 370/259 |
| 2010/0023506 A1 | 1/2010 | Sahni et al. | |
| 2010/0033404 A1 | 2/2010 | Hamadou et al. | |
| 2010/0130296 A1 | 5/2010 | Ackley et al. | |
| 2010/0131865 A1 | 5/2010 | Ackley et al. | |
| 2010/0131947 A1 | 5/2010 | Ackley et al. | |
| 2011/0148924 A1 | 6/2011 | Tapley et al. | |
| 2011/0212717 A1 | 9/2011 | Rhoads et al. | |
| 2011/0242134 A1 | 10/2011 | Miller et al. | |
| 2012/0029994 A1* | 2/2012 | Barkan | G06O 30/0207 |
| | | | 705/14.25 |
| 2012/0075343 A1 | 3/2012 | Chen et al. | |
| 2012/0099800 A1 | 4/2012 | Llano et al. | |
| 2012/0284107 A1* | 11/2012 | Gernaat | G06Q 20/387 |
| | | | 705/14.26 |
| 2012/0320216 A1 | 12/2012 | Mkrtchyan et al. | |
| 2013/0057585 A1 | 3/2013 | Ahmad Athsani et al. | |
| 2013/0130813 A1 | 5/2013 | Ackley et al. | |
| 2013/0288715 A1 | 10/2013 | Shieh et al. | |
| 2014/0036097 A1 | 2/2014 | Sexton | |

OTHER PUBLICATIONS

Schmalstieg, D. et al., "Augmented Reality 2.0," (Research Paper), 2011, 20 pgs http://data.icg.tugraz.at/~dieter/publications/Schmalstieg_195.pdf.

Waechter et al., "Vision Based People Tracking for Ubiquitous Augmented Reality Application," 8th IEEE Int'l Symposium on Mixed Augmented Reality, Oct. 9, 2 pgs.

* cited by examiner

```
                                                    ┌─500
Deliver targeted content to the user corresponding to the identity based
                   on the website access  516

Form the targeted content based on website access and a
              selection history of the user  518

Deliver a personalized printed advertisement
   containing the targeted content to the user  520

Print the advertisement to include the targeted content
                              522

Personalize the advertisement by adding to each
       printed copy a code unique to that copy  524

Deliver an aura containing the targeted content
                    to the user  526

Construct the aura to include
            the targeted content  528

Deliver the targeted aura
      from the AR Server to the WLCD  530

Maintain the selection history on at least one of the AR
   server, the WLCD, the website, and an analytics server  532
```

End

AUGMENTED REALITY SERVER

CROSS-REFERENCE TO RELATED APPLICATIONS

This application is a continuation of the co-pending U.S. application Ser. No. 13/562,479, filed on Jul. 31, 2012, entitled "WEB-LINKED CAMERA DEVICE WITH UNIQUE ASSOCIATION FOR AUGMENTED REALITY", by Douglas A. Sexton, which is hereby incorporated by reference herein in its entirety.

BACKGROUND

Web-linked camera devices that support downloadable client applications continue to proliferate. Such devices include, for example, smart phones and tablet computers, among others. These devices can run applications which utilize augmented reality technology to provide information on demand, often in a multimedia manner, about a scene or object being viewed with the camera. For example, if a user on a city street points his device such that the camera views a historic building, the application can identify the building being imaged by the device and superimpose on the device display text that explains the history of the building. Or, the application can superimpose on the device display a video clip that shows scenes of the building as it looked 50 or 100 years ago, or a clip that shows the changes in the building that occurred from time to time over a period of years. As another example, the user may point his device at a particular story in the newspaper, and then a video report about the events described in the story can be presented.

DETAILED DESCRIPTION

As noted in the Background section, certain software applications for a web-linked camera device ("WLCD") may utilize augmented reality ("AR") technology. As defined herein and in the appended claims, "augmented reality" shall be broadly understood to mean a live view of a physical object or scene which is augmented by computer-generated content. This content may include video, audio, still images, graphics, text, and the like. Also as defined herein and in the appended claims, an augmented reality "aura" shall be broadly understood to mean the computer-generated content presented on a device when a particular scene or object is imaged with the camera of the device. Visual elements of the aura may be superimposed on the camera image on the device's display. Thus an aura is associated with a corresponding image perceived by the camera. In many cases, a number of auras are downloaded to the WLCD. In this way, an aura can be instantly presented on the device whenever the application recognizes that the WLCD's camera is presently viewing the image associated with that aura. This instantaneous feedback is a beneficial aspect of the user experience.

As has been noted, AR technology has been used with printed content, such as stories in a newspaper, to bring to the reader multimedia content that is associated with the printed content. In terms of the user experience, it can be thought of as "bringing the story to life", or "lighting up" the story. The newspaper publisher achieves this by creating an AR channel for the newspaper. As defined herein and in the appended claims, an augmented reality "channel" shall be broadly understood to mean the electronic communications mechanism through which a specific set of auras are delivered to WLCDs. Typically the channel is specific to an aura provider; for example, the newspaper publisher. An AR server external to the WLCD may serve a large number of auras for a large number of aura providers, and channels allow the appropriate auras to be delivered to a WLCD. WLCD users can subscribe to a desired AR channel using a generic AR application software program, or can download to the WLCD a specific AR client application software program that automatically subscribes to that channel. Subscribing to the channel downloads to the WLCD some or all of the set of auras for the channel from the AR server. When the user subsequently hovers the WLCD over a story in the newspaper for which an aura exists in such a manner that the camera of the WLCD images the story, the aura associated with the story is presented on the WLCD display, typically by superimposing the aura on the displayed image from the camera. If the aura includes multimedia content such as video or audio, this content is played on the WLCD.

An aura also typically includes one or more "weblinks". As defined herein and in the appended claims, an augmented reality "weblink" shall be broadly understood to mean a user-selectable feature of the presented aura which operates as a control button or hyperlink to initiate the obtaining and/or presentation of content, different from the aura, on the WLCD. Each weblink is typically associated with a particular URL on the internet. In some examples, a weblink may call or invoke from the aura other functions of the WLCD, such as the calendar, telephone, or SMS, for example. The AR application software program on the WLCD is communicatively coupled to a web browser of the WLCD. When the user interacts with the WLCD to select a particular weblink, the browser is directed to the URL that corresponds to that weblink, allowing the user to view on the WLCD non-AR web content that is external to the AR environment. The non-AR web content is typically provided to the WLCD by a different server from the AR server.

Augmented reality can be applied to the field of advertising in a similar manner as for newspaper articles. An advertiser, such as for example a goods or services provider, can create a printed advertisement and establish an associated AR channel. If a viewer of the advertisement is interested in the product or service advertised, he or she can hover their WLCD over the ad, and view the related aura to get further information in greater detail, to see the product in operation, and so on. The viewer can also select a weblink of the aura in order to, for example, browse an web site external to the AR environment to explore the product or service further. In some cases, the user may decide to purchase the product or service using the web site. However, in other cases the user does not. In such instances, the advertiser would like to understand what was effective or ineffective about the advertisement, so that a more effective advertisement could be provided in the future. The user's weblink selection history with the AR software application, in combination with the user's browsing history of page selections on the web site, can be used to measure or assess ad effectiveness. The tracking and assessment of other aura response functions such as the calendar, telephone or SMS may also be indicative of user preferences, and may be of value in the selection of aura content and advertising delivered to users.

Ad effectiveness may be measured in at least two ways. One way is in the aggregate: for all the users who viewed the ad, how many of them responded with a particular weblink selection and/or browsing history. While this is of some usefulness to advertisers, a more desirable measurement is one that is individualized: that is, the particular weblink selection and/or browsing history for a specific user. This measurement is more valued by advertisers because it allows them to craft ads that are targeted to a group of users who fit a user profile based on the actual behavior of specific users, which presumably reflects their interest in a particular product or service. The advertiser can define the number of users to include in the group that fits the user profile; the group may range in size from a large number of users down to just a single user.

However, as has been mentioned, each AR channel is subscribed to by a number of users. The AR server does not distinguish one user of the channel from another user. Therefore, when a user of the AR client application WLCD selects a weblink, the web site corresponding to the URL to which the browser of the WLCD is directed does not know the specific user. Thus, without more, the web site cannot ascertain the identity of the user of the WLCD, and thus it does not have any way to direct a targeted ad to that user.

Referring now to the drawings, there is illustrated an example of an augmented reality environment constructed in accordance with the present disclosure which delivers targeted content to a user of a WLCD.

As defined herein and in the appended claims, "targeted content" shall be broadly understood to mean content that is tailored to a set of users for whom the content is intended. In operation, an identity of the user of the WLCD is established. Then when a weblink on an aura is selected by the user of the WLCD, the identity is received at the website which corresponds to the weblink. This allows targeted content, such as targeted advertising content, to be delivered to the user based on the identity and the website access.

Figure 1:
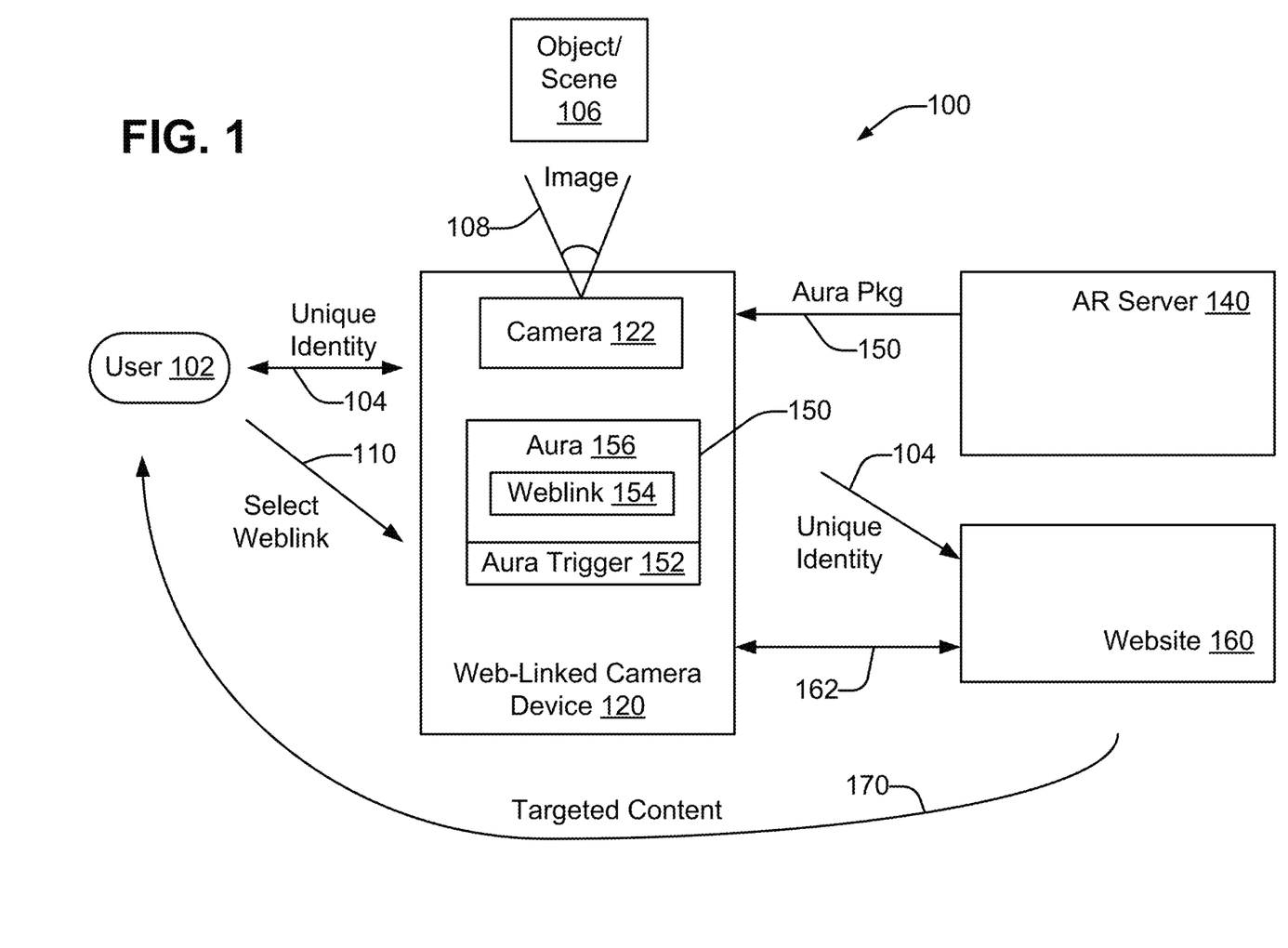
FIG. 1 is a schematic representation of an augmented reality environment for delivering targeted content to a user of a web-linked camera device in accordance with an example of the present disclosure.

Considering now one example of the AR environment in greater detail, and with reference to FIG. 1, the environment 100 includes a WLCD 120, an AR server 140, and a website 160. A user 102 interacts with the WLCD 120. A unique identity 104 between the user 102 and the WLCD 120 is established. The AR server 140 provides at least one aura 156 to the WLCD 120. The aura 156 includes at least one weblink 154. The aura 156 is typically provided in an aura package 150 that also includes an aura trigger 152. The aura trigger 152 describes characteristics of an image that, when recognized, trigger the presentation on the WLCD of the aura 156.

The WLCD 120 includes a camera 122. An object or scene 106 viewed by the camera 122 produces a camera image 108. An AR client application on the WLCD 120 continuously or periodically processes the camera image 108 and compares it to the aura trigger 152. When the AR client application recognizes that the camera image 108 has at least substantially the same characteristics as the aura trigger 152, the application presents the content of the aura 156 on the WLCD 120. The content of the aura 156 may include static images or multimedia (i.e. video/audio) content, and also includes the weblink 154. The visual portion of the content is typically superimposed on the camera image 108 being viewed.

The user 102 can interact with the WLCD 120 to select a particular weblink 154. In response to the weblink 154 being selected 110 by the user 102, the website 160 is accessed 162. The unique identity 104 is provided to the website 160. The identity 104 may be provided to the website 160 by the WLCD 120, the AR server 140, or by a different mechanism. The user 102 may then further interact with the website 160; for example, by selecting various hyperlinks on, or entering data into, a web page (not shown) provided by the website 160 to the WLCD 120.

As a result of the website 160 access, including in some cases these further interactions, content 170 that is targeted to the user 102 is delivered to the user 102. In some examples, the content 170 is formed based on the website 160 access and a history of prior selections made by the user that are related to the website 160. When the content is targeted advertising content, the website 160 can use the history of the prior selections to appropriately tailor (i.e. target) the content to the interests and desires of the particular user. In some examples, the history of prior selections may include an identification of the aura 156 associated with each prior selection.

In some examples, the targeted content 170 may be delivered to the user 102 in printed form, such as a printed advertisement. In these examples, the identity 104 links the user 102 to a specific mailing address.

In other examples, the targeted content 170 may be delivered to the user 102 as a new or updated targeted aura 156 that is delivered to the WLCD 120 by the AR server 140. In these example, the AR server 140 uses the identity 104 to deliver the aura 156 to the WLCD 120 that corresponds to the identity 104.

In some examples, the object 106 is a targeted printed advertisement that is provided to the user, and the unique identity 104 between the user 102 and the WLCD 120 is established by linking the WLCD 120 to a unique code included on the targeted printed advertisement. In these examples, the unique code serves to personalize the targeted printed advertisement to a single user. In some of these examples, the identity of the user may be known at the time the advertiser delivers the ad to the user, while in others of these examples the identity of the user may not be known until after the user takes a subsequent action after receiving the ad. The unique code can be represented in any of a variety of forms. The code may be human-readable, such as text, and/or machine-readable. One example machine-readable code is a bar code, such as a two-dimensional (or matrix) quick response ("QR") code. Another example machine-readable code is a watermark (human-perceivable or hidden) added to an image of the personalized advertisement. Machine-readable codes are typically imaged by the camera 122, and the captured image processed by an application of the WLCD 120 in order to determine the code.

In some examples, the AR client application is downloaded to the WLCD 120 as part of, or subsequent to, establishing the unique identity 104 between the user 102 and the WLCD 120. In these examples, the AR client application receives the aura 156 in the aura package 150; presents the aura 156 on the WLCD when the characteristics of the camera image 108 are substantially the same as the aura trigger 152; and receives the user's selection of the weblink 154. In some examples it also directly provides the identity 104 to the website 160, while in other examples it indirectly provides the identity 104 to the website 160 by providing the identity 104 to the AR server 140 which in turn provides it to the website 160.

Figure 2:
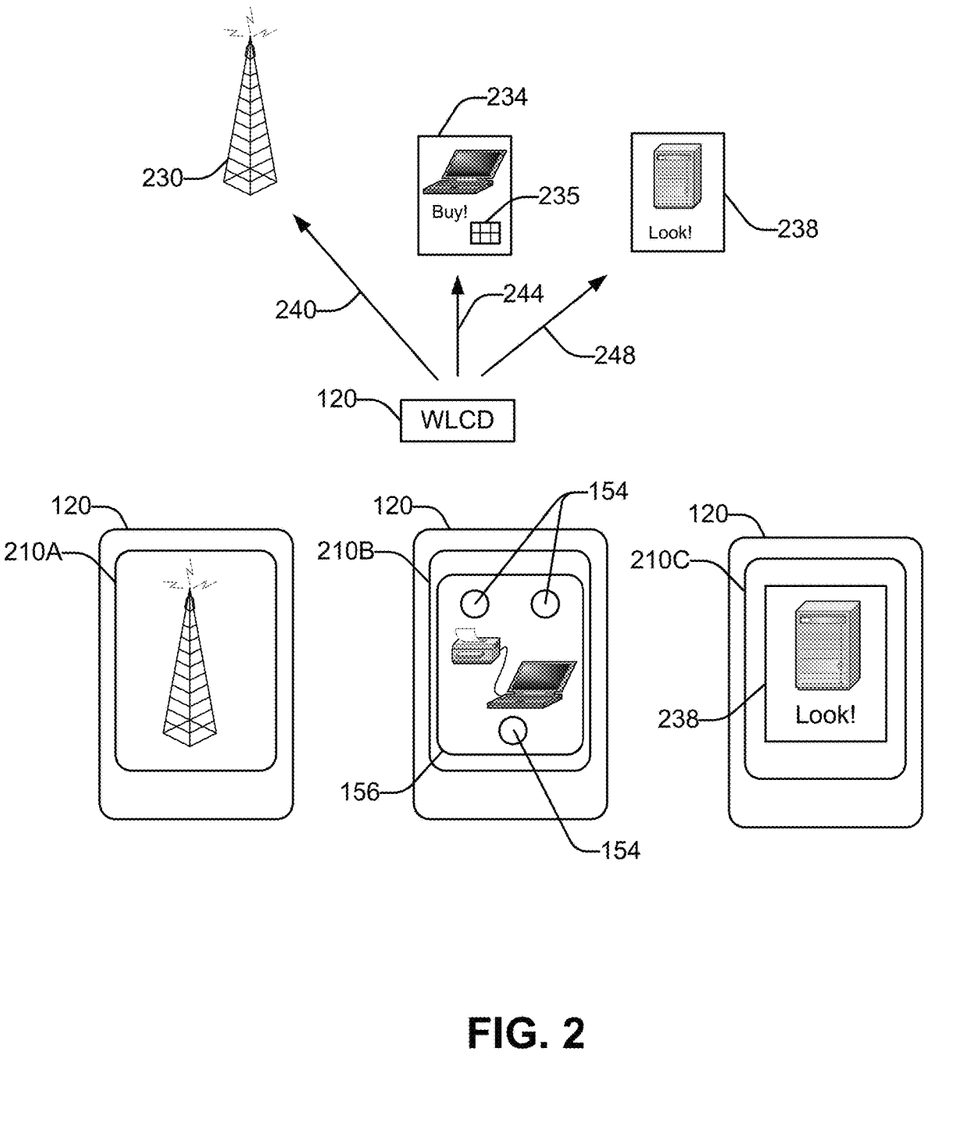
FIG. 2 is a schematic depiction of an example operation of the web-linked camera device of FIG. 1 in accordance with an example of the present disclosure.

Considering now in further detail an example user interface of the WLCD 120 during an example operation of the AR client application, and with further reference to FIG. 2, the WLCD 120 includes a display 210. The scene or object being viewed by the camera 122 is imaged on the display 210.

Consider an arrangement of three items: a radio tower 230, a printed advertisement for a notebook computer 234 which may include a code 235, and a printed advertisement for a desktop computer 238. Assume that the AR client application has received an aura package 150 for which the aura trigger 152 corresponds to the image of, or on, the printed advertisement 234. The aura 156 includes three weblinks 154.

There is no aura trigger 152 associated with either the scene of the radio tower 230, or with the object of the printed advertisement 238 for the desktop computer. Thus, when the camera hovers 240 in front of the scene showing the radio tower 230, the display 210A shows the image of the radio tower 230 as captured by the camera 122. When the camera hovers 248 in front of the desktop computer ad 238, the display 210C shows the image of the desktop computer ad 238 as captured by the camera 122.

However, when the camera hovers 244 in front of the printed advertisement for a notebook computer ad 234, the AR client application recognizes that the characteristics of the camera image of the ad are at least substantially the same as those of the aura trigger 152. In response, the AR client application superimposes on the display 210C the aura 156. The aura content—for example, a video clip showing the notebook computer in operation with a printer—is presented on the display 210. In addition, the three weblinks 154 are rendered on the display 210 in the form of selectable buttons. The user 102 can interact with the WLCD 120 to select one of the buttons and access the website associated with that button, as has been described heretofore.

The structure and use of the code 235 on the notebook computer 234 will be discussed subsequently in greater detail.

As has already been described, according to the present disclosure an AR client application program on a WLCD interoperates with an AR service (i.e. an AR server program) on an AR server to deliver targeted content to a user, where the content is tailored to his particular interests and desires. The targeted content can be delivered as a targeted printed advertisement which may also be personalized to a specific user, or as a targeted AR aura on the WLCD.

Figure 3:
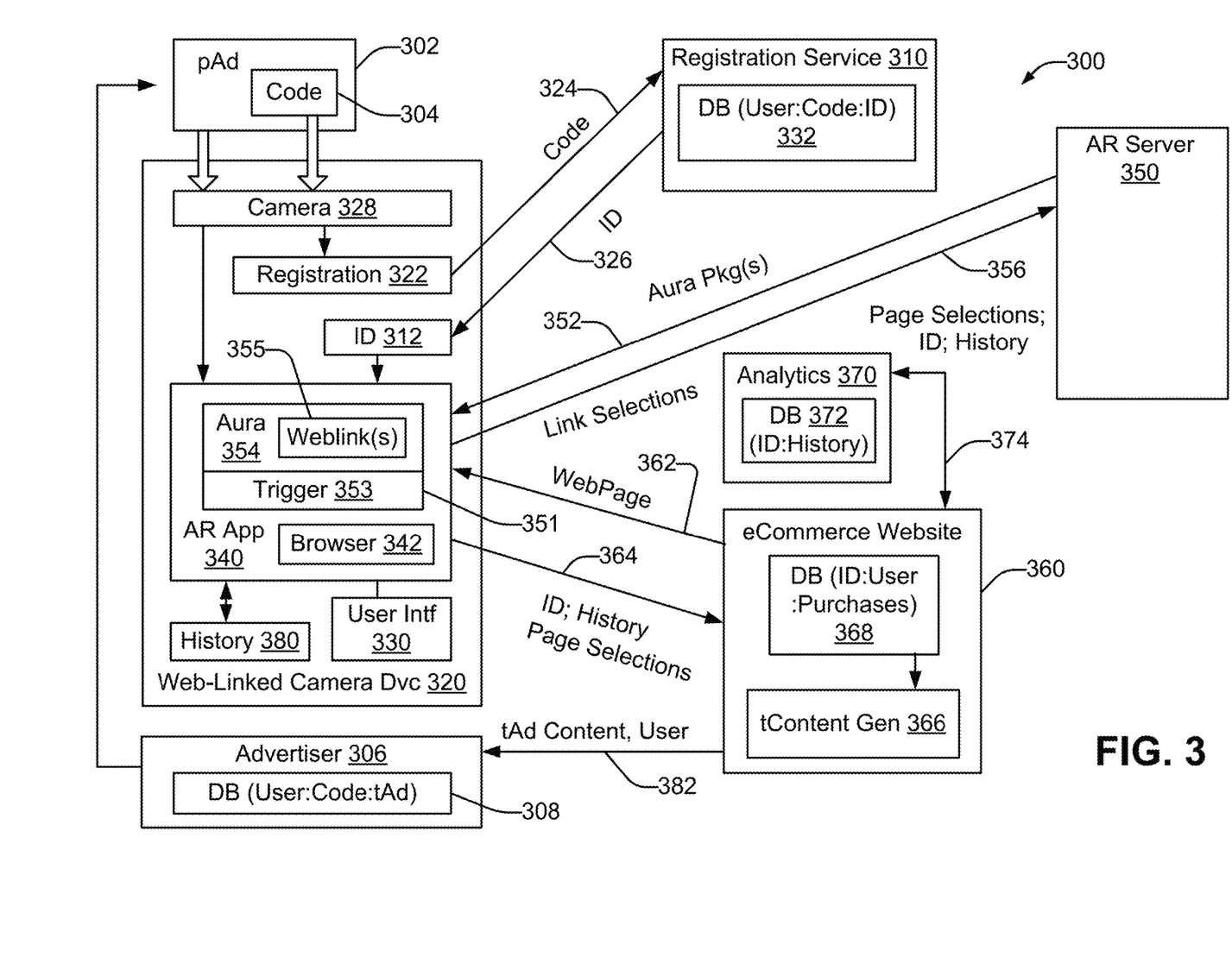
FIG. 3 is a schematic representation of an augmented reality system to deliver a personalized printed advertisement to a user in accordance with an example of the present disclosure.

Considering now in further detail an example of a system 300 to deliver a personalized printed advertisement ("pAd") to the user, and with reference to FIG. 3, one or more personalized printed advertisements 302 are delivered to the user. In some examples, a first personalized printed advertisement 302 may include targeted content that is tailored to the user's particular interests and desires. In other examples, the first personalized printed advertisement 302 may include generic content that is not tailored to the user's particular interests and desires. After the user has interacted with the AR application on the WLCD, additional personalized printed advertisements 302 that take into account the user's interactions with the AR application may be delivered to the user. Since the user's interactions are presumed to be indicative of his or her particular interests and desires, the subsequent ads 302 typically include targeted content that is better tailored to the user's interests and desires.

A personalized printed advertisement 302 includes ad content and a printed code 304. As has been described, the printed code 304 may be text, a matrix barcode such as a QR code, a watermark, or the like. The printed code 304 is indicative of a particular multi-subscriber channel of an AR service. The channel of the AR service may be associated with a particular product manufacturer, service provider, retailer, advertiser, etc. The printed code 304 is unique to the user, and may be reused on additional or later ads 302 delivered to the same user through the same channel. The ad content, is or includes, a printed image that is capturable by a camera 328 of the WLCD 320. The ad content may be generic to multiple users, or it may be specific to a particular user.

In some cases, such as those where the ad 302 is to be mailed to a specific person whose identity is known to the advertiser at the time of delivery of the ad to the user, the advertiser 306 (e.g. the personalized ad publisher) who generates the first ad 302 has direct or indirect access to a database, such as mailing database 308, which links the printed code ("Code") to user contact information ("User"), such as for example his or her name, mailing address, or the like. The database 308 may also link the code to the targeted ad ("tAd") content. In other cases, the advertiser 306 who generates the first ad 302 may not have access to user information. This may occur, for example, where the advertiser 306 does not know the specific person to which the first ad 302 will be delivered; for example, where the first ad 302 is an insert in a magazine or a newspaper that will be purchased or obtained at a later time, such as for example at a retail store or kiosk, by a person whose identity is not known at the time the ad 302 is printed or delivered. In such situations, the printed code is made unique to the printed ad 302, such that no two printed ads 302 have the same printed code.

The printed code is usable by a registration service 310 to link a particular user to his or her WLCD 320. A registration function 322 in the WLCD 320 sends 324 the code 304 to the registration service 310. The registration service 310 then generates an identity ("ID") 312, and sends 326 the ID 312 to the WLCD 320 where it is stored. The ID 312 is the linkage between the WLCD 320 and the user.

Where the printed code 304 is machine-readable, such as for example a QR code, the registration function 322 may be a code reader application on the WLCD 320 that captures an image of the code 304 with the camera 328 and sends the code 304 to the registration service 310. Where the printed code is human-readable, such as for example alphanumeric text, the registration function 322 may be an application on the WLCD 320 that receives the code 304 entered by the via the user interface 330 of the WLCD 320, and that sends the code 304 to the registration service 310. The user interface 300 may be, for example, a touchscreen that provides both a display and an input mechanism. In some examples, the WLCD 320 accesses the registration service 310 via the Internet; in these examples, the code 304 may be a personalized URL for the registration service 310. In other examples, the WLCD 320 accesses the registration service 310 via an SMS (text message) service; in these examples, the code 304 may be a personalized SMS message.

The registration service 310 has direct or indirect access to a database 332. The registration 310 enters the generated ID 312 into a record for the code 304. Typically the record for the code 304 has been predefined, and it also typically associates user contact information with the code 304. If the user's contact information is not known, as in the situation described above where the advertiser 306 does not know the specific persons to which the first ad 302 was delivered, the registration service 310 may interact with the user through the WLCD 320 to collect the user's name, mailing address, email address, and/or the like. However, where the user's contact information is already known, the unique code 304 suffices to identify that user; there is no need for any further interaction with the user during the registration process to obtain such information.

In some examples, the registration service 310 may also initiate the download of the AR application 340 to the WLCD 320. The registration service 310 may provide the AR application 340, or may direct the WLCD 320 to a site such as an App Store from which the AR application 340 may be downloaded to the WLCD 320. As mentioned previously, the AR application 340 typically subscribes automatically to the AR channel associated with the ad 302. The subscription process includes downloading 352 to the WLCD 320 at least one aura 354 for the subscribed channel from an AR server 350. Each aura 354 includes at least one weblink 355, each of which is associated with a corresponding URL on the internet. Each aura 354 is downloaded as part of an aura package 351 which includes an aura trigger 353 associated with the aura 354. The aura trigger 353 specifies image characteristics that corresponds to characteristics of an image of the ad content of the personalized ad 302.

When the user hovers the WLCD 320 over the personalized ad 302 in such a manner that the camera 328 of the WLCD 320 images the ad content, the AR application 340 recognizes that the characteristics of the image captured by the camera at least substantially match the aura trigger 353. The AR application then superimposes the aura 354 on the display of the user interface 330, typically on top of the displayed image from the camera, and any multimedia content associated with the aura 354 is played on the WLCD 320.

When a weblink 355 is selected by the user via the input mechanism of the user interface 330, the AR application 340 accesses the website corresponding to the URL. Typically this is an eCommerce website 360 associated with the printed ad 302. A web page corresponding to the URL is sent 362 to the WLCD 320 and displayed on the browser 342 which is communicatively coupled to the AR application 340. In some examples, the AR application 340 sends 356 the weblink selection to the AR server 350, which may use the selection to charge a fee to the eCommerce website 360 for the use of the weblink to direct the user to the website 360.

The user can then interact with the website 360 to browse content on the website 360 that is related to the product or service advertised by the printed ad 302, and purchase the product or service if desired. Browsing the content includes selecting hyperlinks on the web page. The hyperlink web page selections are then communicated 364 from the WLCD 320 to the website 360 along with the ID 312. In response, the website 360 may send 362 a new web page corresponding to the selected hyperlink to the WLCD 320, which is then displayed on the browser 342 for subsequent user interaction.

A selection history can be constructed that encompasses the user's interactions with the WLCD 320 in selecting weblinks of the aura 354 and browsing the eCommerce website 360 via hyperlinks. The ID 312 enables the selection history performed on a particular WLCD 320 to be associated with its user. The selection history can then be used to determine the ad content of a subsequent personalized ad 302 to be delivered to that user. By determining the ad content based on the user's selection history, targeted ad content can be crafted that is better aligned with the interests, needs, and desires of the user. Such targeted ad content is valued by advertisers as being more likely to result in a purchase of the advertised product or service by the user as compared to a generic ad that does not take these factors into consideration.

In some examples, part or all of the selection history of the WLCD 320 can be stored on the WLCD 320 as a history 380. The history 380 can be communicated 364 from the WLCD 320 to the website 360. The history 380 can be accumulated on the WLCD 320 as the user interacts with the AR application 340 and the browser 342.

In some examples, part or all of the selection history of the WLCD 320 can be stored 374 in a database 372 on an analytics server 370. The analytics server 370 can be coupled to the website 360 such that in the database 372 the server 370 associates each selection with the ID 312 of the WLCD 320 on which the selection was made. By storing records in the database 372 which associate each item of the selection history with the corresponding ID 312, the analytics server 370 can provide 374 to a requestor (such as the website 360) the individual selection history of each of a large number of users.

The eCommerce website 360 includes a targeted content generator 366 that determines the targeted ad content of a subsequent personalized ad 302 to be delivered to that user based at least in part on the selection history. In some examples, the content generator 366 may be initiated in response to a selection by a user of a particular weblink 355 of an aura 354, or a particular hyperlink on a web page from the website 360. For instance, the user may select a weblink 355 or hyperlink that explicitly requests further information. Or, the content generator 366 may evaluate a selection by the user, in some cases in conjunction with the user's selection history, and determine that it is appropriate to deliver a new advertisement to the user. Where the selection history is stored on the WLCD 320 as a history 380, the content generator 366 can obtain 364 the selection history 380 from the particular WLCD 320 associated with an ID 312. Where the selection history is stored on the analytics server 370, the content generator 366 can obtain 374 the selection history associated with a particular WLCD 320 from the database 372 using the ID 312 as a qualifier.

In some examples, the website 360 has direct or indirect access to a database 368 that associates the ID 312 to the user and also to prior purchases made by the user. These purchases may have been transacted through the website 360, or in other ways. The content generator 366 may also use the prior purchase history of the user in determining whether to deliver a new advertisement 302 to the user, and what ad content to include.

The new advertisement may be an updated offer for the same product or service that is advertised by the present ad 302. For example, the new ad 302 may offer a better price, or include some accessories. The new ad may customize the product or service based on the user's selections such that it better fits his needs or desires. The new ad may alternatively be for a different product or service than that which is advertised by the present ad 302. For example, the user's selections may indicate that he or she might have interest in a related product or service.

If the content generator 366 determines that it is appropriate to deliver a new advertisement to the user, the content generator 366 generates the targeted ad content, and provides 382 it, along with information that identifies the user, to the advertiser 306. This information may directly identify the user, such as his contact information, or it may be the ID 312 which indirectly identifies the user and from which his contact information may be ascertained. As has been discussed, the advertiser 306 may have direct or indirect access to a mailing database 308 that associates the user contact information to the printed code 304 on the personalized ad 302. The advertiser 306 then generates a new personalized printed ad 302 that contains the targeted ad content and the printed code 304. If the new personalized printed ad 302 is associated with the same AR channel and/or AR application 340 as the first ad 302, the code 304 will be the same for both of the ads 302. Otherwise, the advertiser 306 may generate a new code 304, record the new code 304 in the database 308 associated with the user, and print the new code 304 on the personalized printed ad 302. If the database 308 does not include an existing entry for the user, a new code 304 may be generated for the user contact information provided, and a new record entered in the database 308 that associates the user with the code 304. After the personalized printed ad 302 is generated, the advertiser 306 delivers it to the user.

Figure 4:
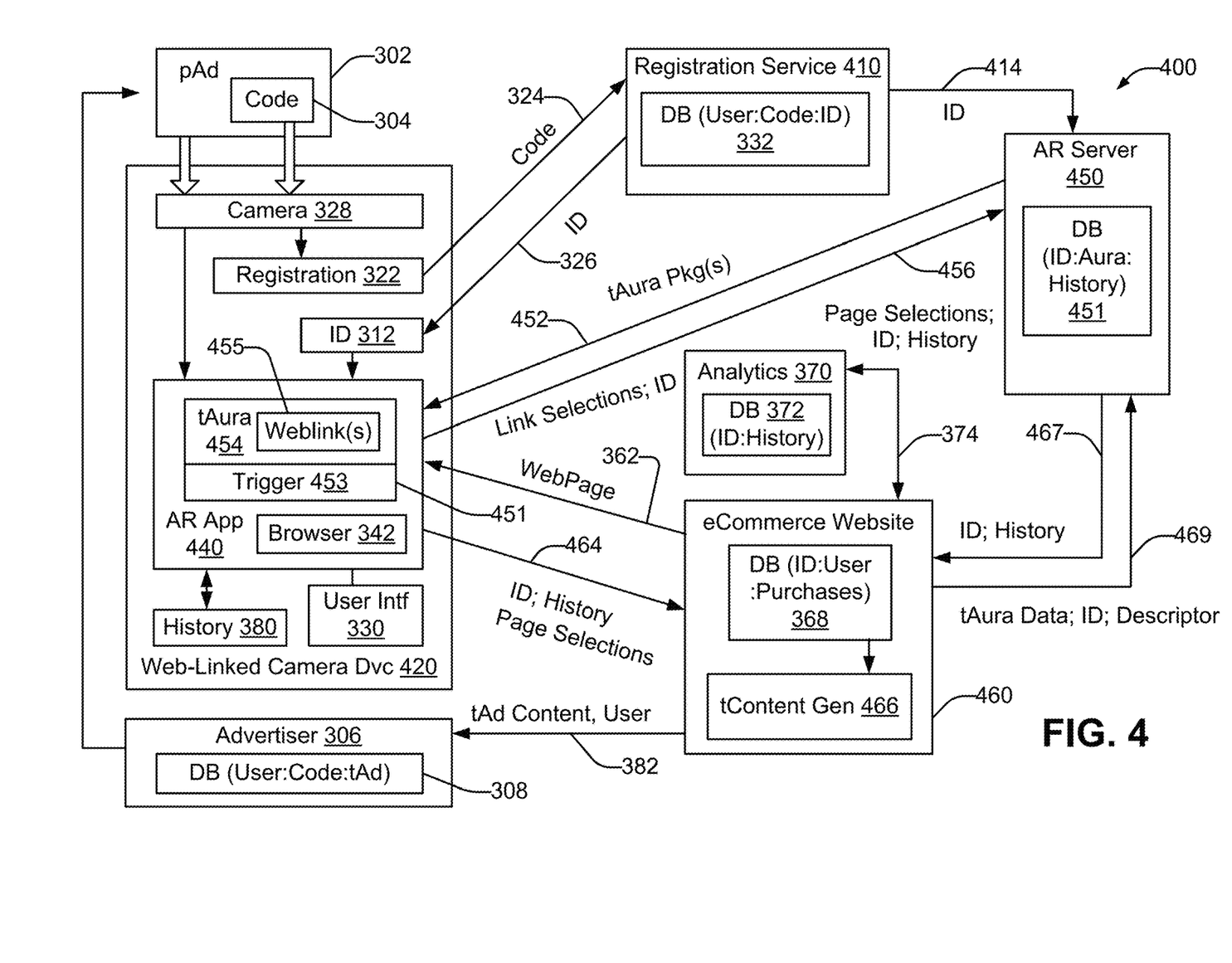
FIG. 4 is a schematic representation of an augmented reality system to deliver a targeted augmented reality aura and/or a personalized printed advertisement to a user in accordance with an example of the present disclosure.

Considering now in further detail an example of a system 400 to deliver to the user of a WLCD a targeted AR aura, and/or a targeted printed advertisement that may also be personalized, and with reference to FIG. 4, one or more targeted AR auras 454 can be delivered to the WLCD 420. A first targeted aura 454 may be tailored to the user's particular interests and desires, or it may not be. After the user has interacted with the AR application on the WLCD 420, one or more additional targeted auras 454 that take into account the user's interactions with the AR application may be delivered to the WLCD 420. Since the user's interactions are presumed to be indicative of his or her particular interests and desires, the subsequent personalized auras 454 may be better tailored to the user's interests and desires.

As has been described with reference to FIG. 3, a personalized printed advertisement 302 that includes ad content and a printed code 304 unique to the user is delivered to the user. In the system 400, the printed code 304 is imaged by the camera 328 and provided 324 by a registration function 322 in the WLCD 420 to a registration service 410. The registration service 410 generates an identity ("ID") 312, stores it in a database 332, and sends 326 the ID 312 to the WLCD 420 where it is stored, in a similar manner as has been described with reference to FIG. 3.

In some examples, the registration service 410 may also initiate the download of the AR application 440 to the WLCD 420 in a similar manner as has been described with reference to FIG. 3 for the AR application 340. In the system 400, however, the channel to which the AR application 440 subscribes is a single-user channel, rather than a multi-user channel. The registration service 410 provides 414 the ID 312 to the AR server 450 that manages the AR channels. The AR server 450 then establishes a single-user channel associated with the ID 312, and the AR application 440 is subscribed to that channel. The AR server 450 may directly or indirectly store a record that associates the ID 312 with the targeted aura 454 in a database 451.

The subscription process includes downloading 452 to the WLCD 420 at least one targeted aura ("tAura") 454 for the subscribed channel from the AR server 450. Each targeted aura 454 includes at least one weblink 455, each of which is associated with a corresponding URL on the internet. In some examples, the URL also includes the ID 312. Each targeted aura 454 is downloaded as part of an aura package 451 which includes an aura trigger 453 associated with the targeted aura 454. The aura trigger 453 and weblink 455 are the same or similar in structure and function to the aura trigger 353 and weblink 355 of FIG. 3.

When the user hovers the WLCD 420 over the personalized ad 302 in such a manner that the camera 328 of the WLCD 420 images the ad content, the AR application 440 recognizes that the characteristics of the image captured by the camera at least substantially match the aura trigger 453. The AR application then superimposes the targeted aura 454 on the display of the user interface 330, typically on top of the displayed image from the camera, and any multimedia content associated with the targeted aura 454 is played on the WLCD 420.

When a weblink 455 is selected by the user via the input mechanism of the user interface 330, the AR application 440 accesses the eCommerce website 460 corresponding to the URL. A web page corresponding to the URL is sent 362 to the WLCD 420 and displayed on the browser 342 which is communicatively coupled to the AR application 340. In some examples, the AR application 340 sends 456 the weblink selection and the ID 312 to the AR server 450. The AR server 450 may use the selection to charge a fee to the eCommerce website 460 for the use of the weblink to direct the user to the website 460. The AR server 450 may also add the weblink selection to a selection history for the ID 312 that is stored in the database 451.

The user can then interact with the website 460 to browse content on the website 460 that is related to the product or service advertised by the printed ad 302, and purchase the product or service if desired. Hyperlink selections on the web page are then communicated 464 from the WLCD 420 to the website 460 along with the ID 312. In response, the website 460 may send 362 a new web page corresponding to the selected hyperlink to the WLCD 420, which is then displayed on the browser 342 for subsequent user interaction.

A selection history can be constructed that encompasses the user's interactions with the WLCD 420 in selecting weblinks of the targeted aura 454 and browsing the eCommerce website 460 via hyperlinks. The ID 312 enables the selection history performed on a particular WLCD 420 to be associated with its user. The selection history can then be used to determine the targeted ad content of a subsequent personalized ad 302 to be delivered to that user. The selection history can also be used to determine aura data for a subsequent targeted aura 454 to be delivered to that user. By determining the targeted ad content and targeted aura data based on the user's selection history, targeted ad content can be crafted that is better aligned with the interests, needs, and desires of the user.

In some examples, part or all of the selection history of the WLCD 420 can be stored in the database 451 on the AR server 450, as has been previously mentioned. Records in the database 451 associate each weblink 455 selection with the ID 312 of the WLCD 420 on which the selection was made, and in some cases also with the targeted aura 454 containing the selected weblink 455. The AR server 450 can construct the weblink selection history for any ID 312 by using the ID 312 as the key to access the database 451. In some examples, the AR server 450 can provide 467 to a requestor (such as the website 460) the individual weblink selection history of each of a large number of users.

In some examples, part or all of the selection history of the WLCD 420 can be stored 374 in a database 372 on an analytics server 370. The analytics server 370 can be coupled to the website 460 such that in the database 372 the analytics server 370 associates each selection with the ID 312 of the WLCD 420 on which the selection was made. By storing records in the database 372 which associate each item of the selection history with the corresponding ID 312, the analytics server 370 can provide 374 to a requestor (such as the website 460) the individual selection history of each of a large number of users.

Although not shown in FIG. 4 for simplicity of illustration, it is noted that in some examples part or all of the selection history of the WLCD 420 can be stored on the WLCD 420 as a history, in a similar manner as has been explained with reference to history 380 (FIG. 3).

The eCommerce website 460 includes a targeted content generator 466. The content generator 466 determines the targeted ad content of a subsequent personalized ad 302 to be delivered to a user based at least in part on the selection history of that user. The personalized content generator 466 also determines the targeted aura data for a subsequent targeted aura 454 to be delivered by the AR server 450 to the WLCD 420 based at least in part on the selection history of the user of that WLCD 420.

In some examples, the content generator 466 may be initiated in response to a selection by a user of a particular weblink 455 of an aura 454, or a particular hyperlink on a web page from the website 460, in a similar manner as has been explained previously with reference to FIG. 3. Where the selection history is stored on the analytics server 370, the content generator 466 can obtain 374 the selection history associated with a particular WLCD 420 from the database 372 using the ID 312 as a qualifier. Where the selection history is stored on the AR server 450, the content generator 466 can obtain 467 the selection history associated with a particular WLCD 420 from the database 451 using the ID 312 as a qualifier. Where the selection history is stored on the WLCD 420 as a history, the content generator 466 can obtain 464 the selection history from the particular WLCD 420 associated with an ID 312.

In some examples, the website 460 has direct or indirect access to a database 368 that associates the ID 312 to the user and also to prior purchases made by the user. These purchases may have been transacted through the website 460, or in other ways. The content generator 466 may also use the prior purchase history of the user in determining whether to deliver a new personalized printed advertisement 302 and/or a new targeted aura 455 to the user, and what targeted ad content or targeted aura data to include.

The operation of the content generator 466 and the advertiser 306 in crafting and delivering a new personalized printed advertisement 302 to the user is similar to that previously described with reference to the content generator 366 and the advertiser 306 (FIG. 3).

With regard to a new targeted aura 454, the content generator 466 determines whether it is appropriate to deliver a new targeted aura 454 to the user, and what content to include in that new targeted aura 454, in an analogous manner as has been described for a new personalized printed advertisement 302.

If the content generator 466 determines that it is appropriate to deliver an updated offer for the same product or service that is advertised by the existing printed ad 302, this may be done through delivery of a new targeted aura 454. In this case, the user will access the updated offer using the existing printed ad 302, so the new targeted aura package 451 includes the same aura trigger 453 as was used for the prior targeted aura 454. However, after the new targeted aura 454 has been downloaded to the WLCD 420, the user will be presented with the new targeted aura 454 for the updated offer when the existing printed ad 302 is imaged with the camera 328.

If the content generator 466 determines that it is appropriate to deliver a new offer for a different product or service than the one advertised by the existing printed ad 302, this may be done through delivery of both a new targeted aura 454 and a new personalized printed ad 302. In this case, the user will access the new offer using the new printed ad 302 after it has been delivered to him or her, so the new targeted aura package 451 includes a new aura trigger 453 that corresponds to the image of, or on, the new personalized printed ad 302. When the new printed ad 302 is then imaged with the camera 328, the user will be presented with the new targeted aura 454 for the new offer.

The targeted aura data crafted by the content generator 466 is provided 469 from the website 460 to the AR server 450, along with the ID 312. The ID 312 indicates to the AR server 450 the WLCD 420—and thus the single-user channel—to which the new targeted aura 455 is to be provided. The website 466 may also provide 469 to the AR server 450 a descriptor which indicates whether the aura data represents a new aura to be added, or a replacement for an existing aura. In the case of a replacement for an existing aura, the descriptor also identifies the existing aura to be replaced.

In some examples, the aura data includes the aura package 451 itself (aura 454, weblinks 455, and aura trigger 453). In this case, the entire aura package 451 is generated by the content generator 466.

In other examples, the aura data describes to the AR server 450 the aura package 451 that is to be generated, and the AR server 450 then generates the aura package 451. For example, the AR server 450 may store a superset of auras, aura triggers, and weblinks, and use the aura data as a menu with which to choose from this superset in order to construct the aura package 451.

Once the new aura package 451 is in final form on the AR server 450, the AR server 450 downloads the new aura package 451 to WLCD 420. This typically occurs as a background operation while AR application 440 is active, and may be silent to the user. By doing so, the new targeted aura 454 can be immediately presented when the camera 328 images the personalized printed ad 302.

It can be appreciated that the registration service 310, 410 discussed with reference to FIGS. 3-4 may reside on the AR server 350, 450; it may be part of the eCommerce website 360, 460; or it may reside on a separate server. It can also be appreciated that while the databases 308, 332, 368, 372, 451 are shown as various individual databases disposed within different blocks or elements of FIGS. 3-4 for clarity of illustration, some or all of these individual databases may be combined, and that each combined database may be disposed in one of the blocks or elements, or disposed outside any of these blocks or elements.

Figure 5A:
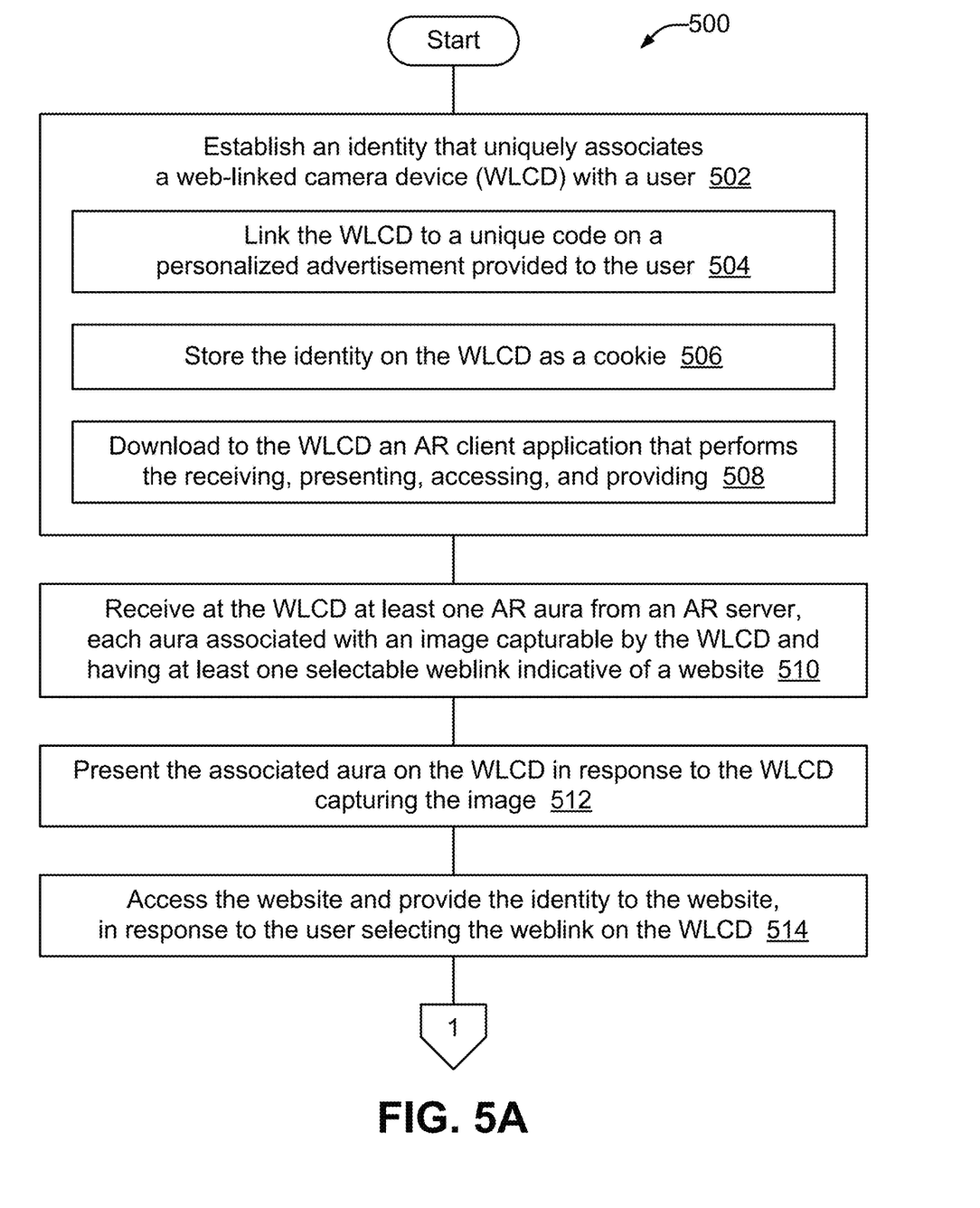
FIGS. 5A-B are a flowchart in accordance with an example of the present disclosure of a method for delivering targeted content using augmented reality.
Figure 5B:
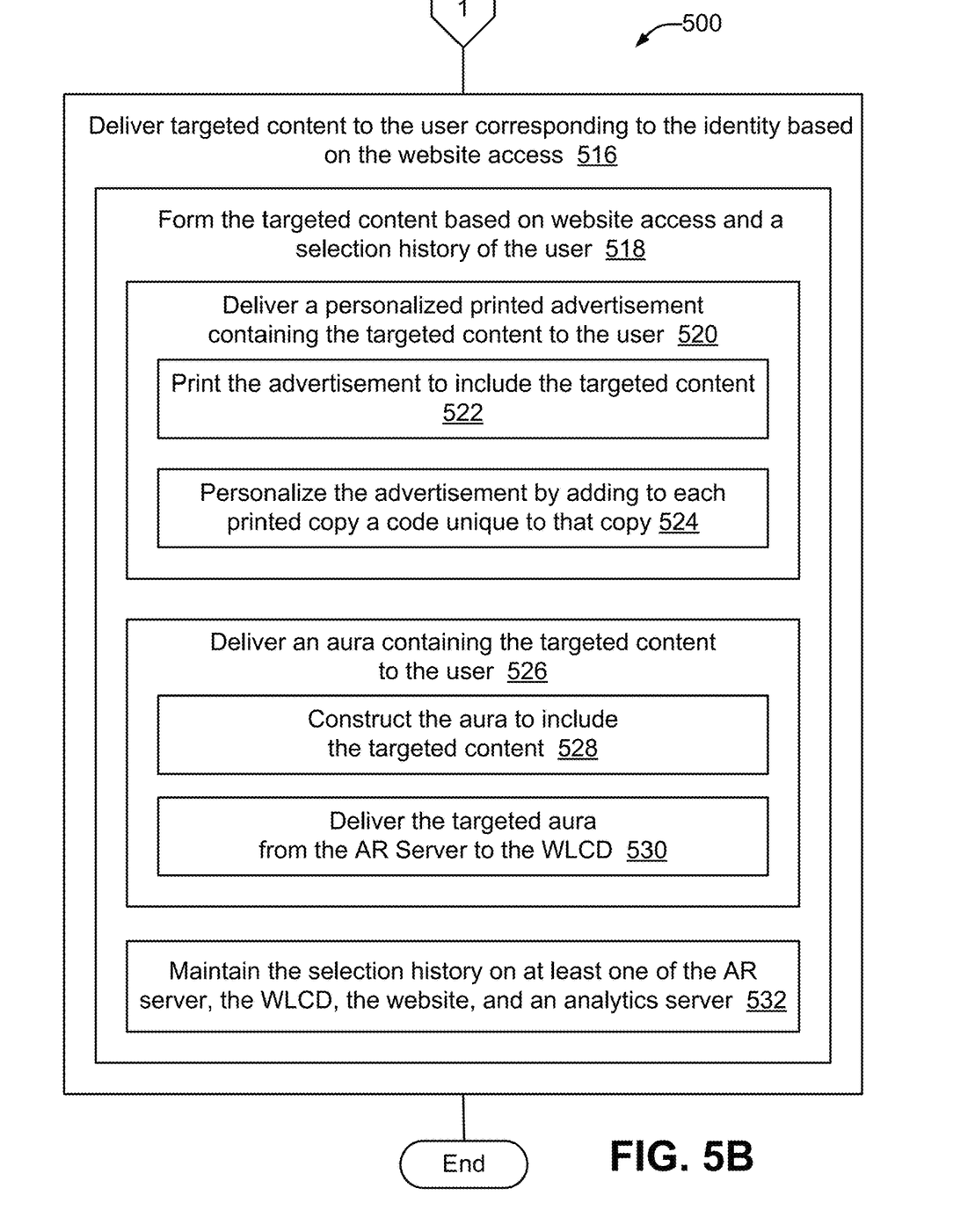

Considering now one example of a method for delivering targeted content using augmented reality, and with reference to FIGS. 5A-B, the method 500 begins at 502 by establishing an identity that uniquely associates a web-linked camera device (WLCD) with a user. In some examples, at 504, the establishing includes linking the WLCD to a unique code on a personalized advertisement provided to the user. In some examples, the establishing 504 includes, at 506, storing the identity on the WLCD as a cookie. In some examples, the establishing includes, at 508, downloading to the WLCD an AR client application that performs the receiving, presenting, accessing, and providing.

At 510, at least one AR aura is received at the WLCD from an AR server. Each aura is associated with an image capturable by the WLCD, and has at least one selectable weblink indicative of a website.

At 512, the associated aura is presented on the WLCD in response to the WLCD capturing the image.

At 514, in response to the user selecting the weblink on the WLCD, the website is accessed and the identity provided to the website.

At 516, based on the website access, targeted content is delivered to the user corresponding to the identity. In some examples, the delivering 516 includes, at 518, forming the targeted content based on website access and a selection history of the user. In some examples, the forming 518 includes, at 520, delivering a personalized printed advertisement containing the targeted content to the user. In some examples, the delivering 520 includes, at 522, printing the advertisement to include the targeted content and, at 524, personalizing the printed advertisement by adding to each printed copy of the advertisement a code unique to that printed copy. In some examples, the forming 518 includes, at 526, delivering an aura containing the targeted content to the user. In some examples, the delivering 526 includes, at 528, constructing the aura to include the targeted content and, at 530, delivering the targeted aura from the AR Server to the WLCD. In some examples, the forming 518 includes, at 532, maintaining the selection history in whole or in part on at least one of the AR server, the WLCD, the website, and an analytics server.

Figure 6:
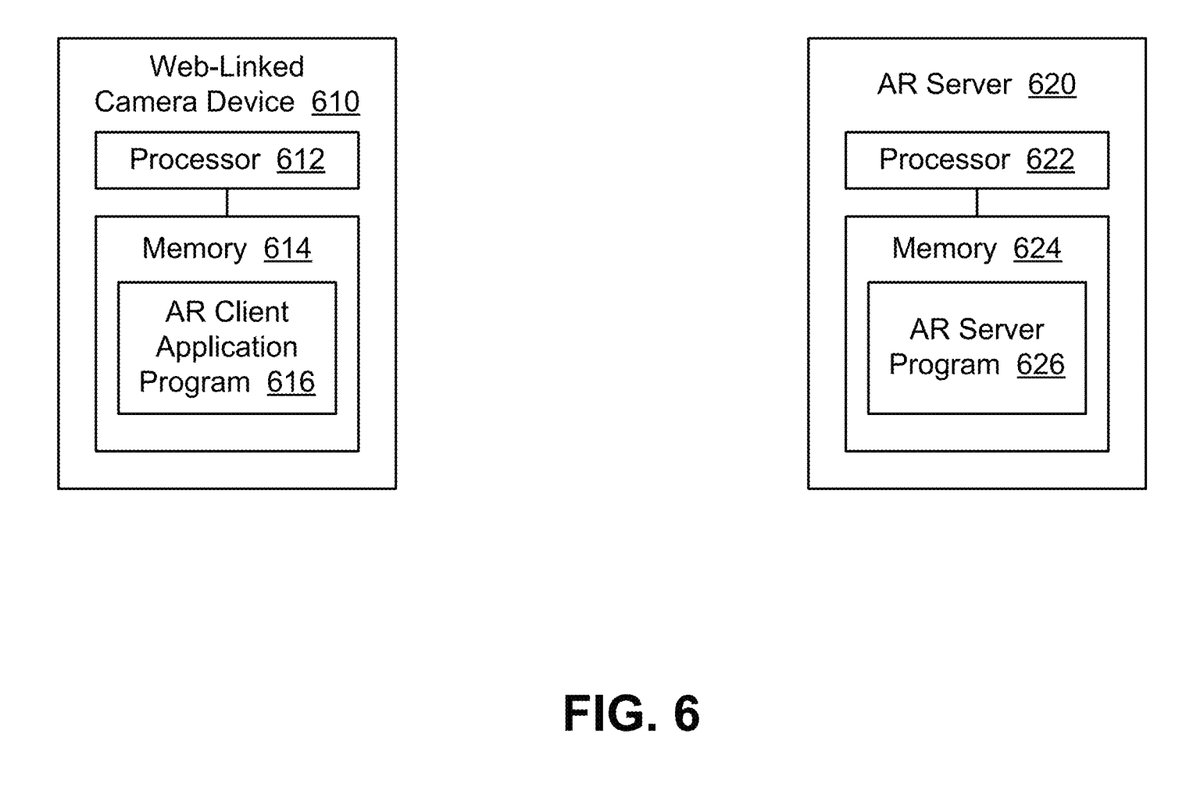
FIG. 6 is a schematic representation of the web-linked camera device and the augmented reality server of FIGS. 1-4 in accordance with an example of the present disclosure.

Considering now in greater detail an example of a WLCD and an AR server, and with reference to FIG. 6, a WLCD 610 includes a processor 612, and a memory 614 which is a computer-readable medium coupled to the processor 612. The WLCD 610 includes an AR client application program 616 stored in the memory 614. The AR client application program 616 has instructions executable by the processor 612. The WLCD 610 may be the WLCD 120 (FIGS. 1-2), 320 (FIG. 3), or 420 (FIG. 4). In some examples the AR client application program 616 may be the AR client application program 340 (FIG. 3), or 440 (FIG. 4).

An AR server 620 includes a processor 622, and a memory 624 which is a computer-readable medium coupled to the processor 622. The AR server 620 includes an AR server program 626 stored in the memory 624. The AR server program 626 has instructions executable by the processor 622. The AR server 620 may be the AR server 120 (FIG. 1), 320 (FIG. 3), or 420 (FIG. 4). In some examples the AR server program 626 may be the AR server program 350 (FIG. 3), or 450 (FIG. 4).

From the foregoing it will be appreciated that the media and methods provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method for delivering targeted auras using augmented reality (AR), comprising:
   transmitting from an AR server to a web-linked camera device (WLCD), over a single-user AR channel of an AR server, a first aura displayable on the WLCD upon capture by the WLCD of a corresponding image, the first aura including one or more user-selectable weblinks that, when selected by a user of the WLCD, cause the WLCD to transmit to an external website but not to the AR server an identity that uniquely associates the WLCD with a user;
   after selection of one of the weblinks by the user at the WLCD, receiving from the external website the identity and aura data indicative of a second aura targeted to the user based on the user-selected one of the weblinks, wherein the single-user AR channel is specific to the identity; and
   transmitting the second aura to the WLCD corresponding to the identity over the single-user AR channel.

2. The method of claim 1, further comprising:
   constructing the second aura from the aura data.

3. The method of claim 1, wherein the second aura is further targeted to the user based on a selection history of the user.

4. The method of claim 1, further comprising:
   receiving from the WLCD a code that uniquely identifies a user of the WLCD;
   generating the identity based at least in part on the code; and
   transmitting the identity to the WLCD.

5. A system, comprising:
   a web-linked camera device (WLCD); and
   an augmented reality (AR) server, comprising:
   a processor; and
   a memory coupled to the processor and having an AR server program executable by the processor to
   transmit to the (WLCD) a first aura displayable on the WLCD upon capture by the WLCD of a corresponding image, the first aura including one or more user-selectable weblinks that, when selected by a user of the WLCD, cause the WLCD to transmit to an external website but not to the AR server an identity that uniquely associates the WLCD with a user;

receive from the external website the identity and aura data indicative of a second aura targeted to the user based on a user-selected one of the weblinks, the identity having been received by the external website from the WLCD; and transmit the second aura to the WLCD corresponding to the identity.

6. The system of claim 5, wherein the second aura is further targeted to the user based on a selection history of the user.

7. The system of claim 5, wherein the selection history includes a sequence of prior selections by the user.

8. A method for delivering targeted auras using augmented reality (AR), comprising:

transmitting from an AR server to a web-linked camera device (WLCD) a first aura displayable on the WLCD upon capture by the WLCD of a corresponding image, the first aura including one or more user-selectable weblinks;

responsive to user selection of one of the weblinks, the WLCD directly accessing an external website and providing to the external website, but not the AR server, an identity that uniquely associates the WLCD with a user;

generating at the external website aura data targeted to the user based on at least one user-selected one of the weblinks;

receiving at the AR server, from the external website, the identity and the aura data; and transmitting from the AR server to the WLCD a second aura targeted to the user, the second aura based on the aura data and the identity.

9. The method of claim 8, wherein the identity is stored on the WLCD.

10. The method of claim 8, wherein the identity is predetermined by the WLCD previously providing to a registration service a code unique to the user that is printed on an advertisement delivered to the user.

11. The method of claim 8, wherein responsive to the user selection of one of the weblinks, the WLCD obtains from the external website a web page corresponding to the selected weblink.

12. The method of claim 8, wherein the captured image is an image of a printed advertisement.

13. The method of claim 12, wherein the printed advertisement includes ad content that is targeted to the user and a code that is uniquely personalized to the user.

14. The method of claim 8, wherein the second aura is further based on a selection history of prior selections by the user stored on the WLCD, and wherein the WLCD sends the selection history to the external website.

15. The method of claim 8, wherein the second aura is further based on a selection history of prior selections by the user stored with other selection histories of other users on an analytics server separate from the WLCD, the AR server, and the external website, and wherein the analytics server provides the selection history of the user to the external website based on the identity.

* * * * *